April 4, 1944.                R. H. SAWYER                2,346,085
             PROCESS FOR PRODUCING IMPROVED TITANIUM PIGMENTS
                            Filed Feb. 6, 1942
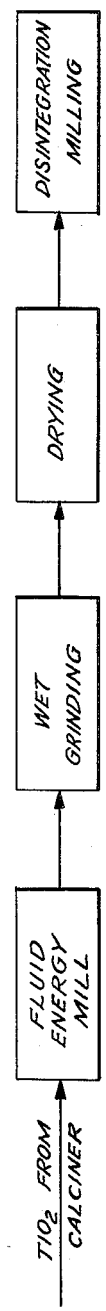
Roscoe Hall Sawyer INVENTOR.
BY
ATTORNEY Patented Apr. 4, 1944

2,346,085

UNITED STATES PATENT OFFICE 2,346,085

PROCESS FOR PRODUCING IMPROVED TITANIUM PIGMENTS

Roscoe Hall Sawyer, Linthicum Heights, Md., assignor to E. I. du Pont de Nemours & Company, Wilmington, Del., a corporation of Delaware Application February 6, 1942, Serial No. 429,802

4 Claims. (Cl. 23—94)

This invention relates to the production of improved pigment substances, and more particularly to the production of titanium pigments of improved quality, characterized by substantially complete freedom from coarse gritty particles and exhibiting improved gloss properties.

The most widely accepted process for producing titanium pigments involves the solubilization of titaniferous ores, especially ilmenite, in sulfuric acid solution, after interaction of the acid in relatively strong form with the finely-divided mineral. The solution obtained upon dissolution of the sulfated ilmenite mass in water contains large amounts of iron as well as appreciable amounts of other impurities present in the titanium ore. A large amount of the iron may be removed by chilling the solution thereby precipitating iron sulfate as copperas crystals. Purification of this solution to remove undissolved and colloidally dispersed materials is required before production of quality pigment can be attained. The purified solution is then hydrolyzed, either in dilute or concentrated form to give a finely-divided hydrolyzate made up of titanium oxide or hydrate along with some combined or adsorbed sulfuric acid. This hydrolyzate is then filtered and washed to remove the contaminating impurities, and is then calcined at temperatures ranging from 750–1100° C. to develop its pigment properties.

Various investigators have suggested and patented processes for improving the pigment characteristics of the material discharged from the calciner, since said material is of relatively coarse, undesired texture. Thus, U. S. Patent 1,885,921 discloses a process for reducing the oil adsorption of titanium pigments by passing the product through a dry grinding mill while exerting pressure thereon. The resulting product, however, is somewhat deficient in certain properties and to effect improvement thereof U. S. Patent 2,214,815 subjects the pressure ground pigment to dry grinding in a mill of the disintegrating type. The wet grinding of titanium pigments in a continuous closed circuit system is proposed in U. S. Patent 1,937,037, this process being quite useful in the breaking up of agglomerated or sintered material present in the calciner discharge.

It is an object of this invention to effect further desired improvements in pigment substances, and to provide an improved and more economical process for producing titanium pigments. A still further and particular object is to improve the gloss characteristics of such pigments. A still further object is the production of titanium oxide pigments which are devoid of agglomerates or aggregates, and therefore particularly adapted for use in enamels and similar types of high gloss coating composition. Additional objects will become apparent from an examination of the following description and claims.

These objects are attained according to this invention which broadly comprises subjecting a previously calcined pigment to a plurality or series of grinding treatments, first to pressure pulverization, then to wet milling, and thereafter, upon drying, to disintegrating milling.

The first step in my improved process comprises a "pressure pulverization" treatment which may be accomplished by the use of various types of pressure pulverizing mills well known to those skilled in the art, including such mills as ring roller mills, edge runner mills, fluid energy mills, and the like. In the practice of my invention, the fluid energy mills are preferred because more effective and superior results are obtained by their use. The fluid energy mills are a recent contribution to the art of grinding. These mills make use of a high pressure gaseous fluid as the energy supply in the grinding operation. The high pressure gaseous fluid, particularly steam, is admitted to a circular manifold through nozzles so disposed as to create a spiraling vortex within the manifold or grinding chamber. The pigment is also admitted to the manifold where it is subjected to pressure pulverization by its circular motion during which it is compressed against the walls of the circular chamber and also to pressure action of particles upon each other. The finely-divided particles find their way to the center of the chamber where they are separated from the gaseous fluid and collected. Steam superheated to a temperature of from about 300° C. to about 500° C. and carrying a pressure of between about 50 to about 150 pounds per square inch has been found particularly useful in my process. It is to be noted that this mill grinds the pigment while the latter is at an elevated temperature and this combination is believed to contribute to my improved product.

My second milling treatment in my series grinding process comprises a closed circuit wet grinding and a number of wet grinding systems well-known to those skilled in the art may be used. Thus, the pigment may be wet ground in a closed circuit system after which it is centrifuged and thereafter the coarse fraction from the centrifuge is then returned to the ball mill for further grinding. Another closed circuit wet grinding system which may be employed comprises that disclosed in U. S. Patent No. 1,937,037, and with or without a dispersing agent, as desired. According to the teachings of said patent, a pigment is suspended in water in the presence of a dispersing agent, such as caustic soda, alkali phosphates, sodium silicate, or ammonia, followed by hydroseparation to separate the fines from the coarser material, and the return of the coarse to the hydroseparator after passage through a continuous ball mill. The hydroseparator overflow usually carries a concentration of between about 100 and about 140 grams $TiO_2$/liter and is then treated for pH adjustment to a value of about 7.2 and coagulated with a coagulant, such as magnesium sulfate. The flocculated suspension is usually thickened for the removal of large amounts of water, after which it is filtered and dried. In this condition it is then ready for my final grinding operation.

My third milling operation in my series grinding process comprises a disintegrating grinding treatment and any type of disintegrating mill (well-known in the art), including such disintegrator mills as rotary hammer mills, squirrel cage disintegrators, high speed fan, fluid energy mills, and the like.

I have found that when pressure pulverizers other than fluid energy mills are used in the first step of my process in combination with disintegrating mills other than fluid energy mills in the third step of my process, the properties of the resulting pigments are greatly superior to the properties of the pigments produced according to prior art processes. However, the greatest improvement in the pigment properties is obtained when fluid energy mills are used in the first and third steps of my process and their use in this manner is therefore preferred.

The accompanying diagrammatic drawing is illustrative of one preferred mode of applying my invention in the series pulverization treatment of a calcined $TiO_2$ pigment.

The pigment produced in accordance with my invention is superior to the prior art product and this is particularly demonstrated when used, for example, in enamel finishes. The pigment property which shows the greatest amount of improvement is gloss as revealed by the film characteristics of the pigmented composition. It is not only important that the gloss of the enamel as initially made be satisfactory but that this gloss property remain constant during shelf storage of the enamel. Various enamels are known to change in character during can storage as is bound to occur between the time of manufacture and use by the ultimate consumer. These cans of paint sometimes remain on the paint dealer's shelf for a number of months and the gloss of the dry film after the storage period has in many instances been found considerably poorer than the film of the same paint when spread within a short time after its preparation. This loss of gloss properties of enamels has been particularly noticeable in the case of compositions carrying substantial amounts of titanium oxide. The cause of this is not well understood but it seems to be a function of the physical condition of the titanium oxide pigment particles. The titanium oxide hydrolyzate particles are thought to be aggregates of finer particles and probably are somewhat porous in character. The nature of this is none too well understood but it is believed that these finer particles are cemented together more or less permanently by gelatinous substances during calcination. These particles change greatly in character but the extent of the disappearance of the aggregative character cannot be well established due to the fineness of the particle.

For purposes of the invention, the term "gloss" may be defined as the ability of a filmed surface to reflect light regularly. Values for gloss may be determined on the Lange photoelectrical gloss meter wherein a deflection of the needle employed therein is adjusted to read "100" on an arbitrary scale for a standard sample of polished black glass and a difference of one point in such scale is material. The method is more particularly described at pages 247–248 of Dr. St. John's translation of Dr. Lange's "Photoelements and Their Application" published in 1938 by the Reinhold Publishing Corporation.

In the evaluation of the gloss properties, I have found that a synthetic resin enamel having a binder consisting of drying oil modified polyhydric alcohol-polybasic acid resin is quite useful. These enamels can be prepared by using 1.25 parts of pigment for each part of non-volatile in the resinous vehicle. I have found it convenient to prepare the paint film by spraying the resulting enamel on to steel panels and bake for 1 hour at 145° C., in a manner such as is practiced in the manufacture of coated steel products such as domestic refrigerators. The resulting films are readily evaluated for gloss by the previously mentioned Lange photoelectric gloss meter and the resulting films are usually found to possess gloss values in the 50–100 range.

This invention may be more readily understood from an examination of the following examples which are given for illustrative purposes and not intended to place any restrictions or limitations on the herein-described invention.

*Example I*

This example will show an operation in which a ring roller mill is used in the first step of my grinding process to effect pressure pulverization of the pigment.

Titanium dioxide was fed to a 50-inch ring roll mill equipped with an air-separation system at the rate of 2300 pounds/hour. The air-separated product was collected and continuously added to a wet grinding system using an amount of water sufficient to produce a pigment concentration of about 120 grams $TiO_2$/liter. The mill discharge and the water were added to an agitated tank along with a sufficient amount of caustic soda to give a pH value of 10.0. The resulting dispersed slurry was continuously added at a uniform rate to the feed well of a hydroseparator tank sufficiently large to give an upward rate of flow of about 0.3 centimeter per minute. The coarser material settled to the bottom and was passed through a continuous ball mill and returned to the original slurrying tank. The fines overflowed the tank and were adjusted to a pH value of 7.3 and at the same time flocculated with magnesium sulfate solution. The flocculated slurry was then thickened, filtered, and dried, followed by passage through a hammer mill of the disintegrating type. The dried mill pigment was then packaged for shipment.

*Example II*

Calcined titanium dioxide, at the rate of 1500 pounds per hour was fed to a fluid energy mill equipped with a 30-inch manifold and six nozzles so located thereon as to set up a spiraling vortex within the manifold or grinding chamber. Steam superheated to 400° C. and at a pressure of 100 pounds per square inch was fed through the nozzles at the rate of 3450 pounds of steam per hour. The discharge from the mill was added to water using about four pounds of the latter for each pound of the milled pigment. The resulting pigment slurry was adjusted to a temperature of 60° C. and treated with 0.12 pound of caustic soda per 100 pounds of pigment. The slurry was thereby deflocculated and was then added continuously to the feed well of a hydroseparator tank in accordance with the teachings of U. S. Patent No. 1,937,037 with the settled underflow being sent to a continuous ball mill and thence again to the tank feed well. The hydroseparated fines were coagulated and adjusted to 7.2 pH using magnesium sulfate and sulfuric acid. The excess water was removed from the flocculated suspension, filtered and dried. The dryer discharge was passed through a second fluid energy mill and bagged for shipment.

The product produced by the process outlined in Example II has been found to give an enamel, following the heretofore suggested formulation, having a gloss rating of between about 93 and about 95. This is a high gloss finish in spite of its high content of titanium oxide pigment. The same pigmented compositions for which these results were obtained were aged for periods of from 3 to 6 months after which they were sprayed and baked and the loss of no more than two points in the gloss value was found. In addition the resulting enamel films after aging for periods of from 3 to 6 months showed gloss values in excess of 90 when kept under favorable conditions to avoid the accumulation of dirt and dust.

The products produced by the milling arrangement shown in Example I are greatly superior to the prior art products but do not possess the gloss values equal to the product of Example II. It is for this reason that I prefer to use fluid energy mills in the first and third steps of my process.

The pigment products obtained in accordance with prior art milling processes in which the product is pressure pulverized subsequent to wet milling are substantially lower in gloss properties than the product of this invention. As heretofore mentioned, the product obtained by the process of Example II, when formulated as suggested above and tested on the Lange gloss meter, has been found to have a rating of between about 93 and about 95. The material produced by the operation of Example I is also high in original gloss and is only 3–5 points lower having a value of about 90. In addition this high gloss of the enamel is retained on can storage and decreases only slightly over a period of from 3–6 months. In contrast, pigments which are first wet ground and then pressure pulverized have been found to have values in the range of about 55–75 using the same formulation and testing methods. These values are improved somewhat by a disintegrating grind subsequent to pressure pulverization. The differential between these previously mentioned prior art figures and those obtained for my product is substantial and only a minor portion of this differential is overcome by the disintegrating grind. It should be emphasized that such prior art pigments have passed through as intensive grinding operations as those proposed in the present process but are far deficient in their enamel film properties. My improved pigment is also easily incorporated in paint vehicle compositions such as oil, varnishes and nitrocellulose solutions. The amount of grinding necessary to form quality enamels is small and the texture and grit properties of the pigment are exceedingly good. Its freedom from coarse particles and its freedom from substantial amounts of agglomeration of the 10–40 micron range accounts in some measure for its superiority.

The magnitude of the improvement in the gloss properties of titanium pigments is readily understood when one realizes that a 10 point gloss improvement is very easily perceived by an untrained observer. White baked enamels carrying this gloss improvement possess definite sales advantages and this is particularly true in the household refrigerator industry. It is to be noted that the pigment produced by my grinding process approaches the gloss properties of the standard glass plate and in many instances are considerably more than the gloss advantage to be observed by an untrained observer.

It is believed that in my series grinding operation the pigment reaches its greatest freedom from coarse particles after the second step and that the third grinding operation is in large measure useful in removing aggregates which appear in the dried pigment due to cementation of the particles to one another. The particle size distribution of the wet ground material prior to dry grinding has been determined and it is believed that my process is conducive to greater freedom from particles having a diameter in excess of 3 microns than any prior art operation. These particles having a diameter in excess of 3 microns have been found to number less than 1% of the particles present. In certain instances substantially less than ½% have been found and these are usually of a size measuring from 5 to 7 microns, or just under the maximum size which are permitted to overflow the hydroseparator.

The pressure pulverization specified for the initial grinding operation is thought to have a decided effect on the character of the pigment and I have advanced the theory that my product contains fewer porous agglomerates than prior art titanium pigment. It seems highly probable that the calcined titanium pigments retain in some measure the characteristics of the hydrolyzate aggregates. During pressure pulverization, as herein defined, these residual porous agglomerances are placed under pressure and any gaseous pockets or pores which are found therein are believed to be eliminated due to the pressure exerted thereon. It seems possible that the residual pores are largely eliminated in this manner but at the same time it seems likely that other pores may develop due to the packing action resulting from the pressure on the titanium dioxide. Pressure pulverization, particularly in the ring roller mill, produces flakelets of titanium dioxide and this is due to the sticky character of the pigment. While the residual pores of the calcined pigment may thus be eliminated, I believe that others are formed and my process is particularly designed for their elimination as well. The subsequent wet grinding is adapted to breaking up these flakelets and giving pigment such as I have described. It is understood that I am not limiting my invention by the theory which I have herein advanced in explanation of the improvement to be derived from the practice of my series grinding operation.

It is to be understood that my invention is useful in the processing of titanium pigments regardless of the type. Thus, it applies not only to straight titanium dioxide pigments, such as have been made from sulfate processes, but also to titanates or extended forms of titanium pigments containing such inorganic extenders as calcium or barium sulfate, or various types of well-known silicate extenders. It is also useful in the production of titanium pigments prepared from titanium tetrachloride or other titanium salt solutions, regardless of the crystal structure of the titanium dioxide, and in the processing and finishing of anatase or rutile forms of titanium dioxide. While specifically described as applied to certain preferred adaptations involving the processing of titanium pigments, it will be obvious that the invention is also suitable for treating or grinding other types of pigment materials, and especially other white, inorganic, previously calcined pigments, such as lithopone, zinc sulfide, etc., or even colored types of pigments, whether of inorganic or organic origin. Hence, the treatment of such other forms of pigment substances in accordance with the invention is contemplated. It will be understood, however, that the major usefulness of the invention resides in the field of titanium pigments, due to the specific and peculiar problems which are confronting in their manufacture and in order to insure the production of a product which will exhibit satisfactory texture, as well as other essential pigment values. During the calcining operation titanium pigments sinter into agglomerates, and in addition present a more difficult disintegrating problem, especially in the later stages of the finishing treatment, due to the sticky character of the particles under treatment.

My milling process is designed for the manufacture of pigments of the finest state of subdivision from a feed material such as is produced by the continuous calcination of titanium hydrolyzates. My process is complete in itself and no preliminary treatment is needed prior to the first step, namely, that of pressure pulverization. The second step or the wet grinding operation is not only useful in reducing particle size of the pressure pulverized pigment but also allows an opportunity for the removal of water-soluble materials particularly fritting materials which sometimes are used in the calcination step. The final milling operation may be conducted by passing the pigment through a fan, a hammer mill, a squirrel cage disintegrator, or a fluid energy mill. The latter has been referred to as both a "pressure pulverizing mill" and also as a "disintegrating mill" and this is proper in that it may be operated under a wide range of conditions. When using high pressure fluids or gases and relatively large amounts of energy per pound of pigment, it operates as a pressure pulverization unit and when a lesser amount of energy is expended, as is practiced when passing wet ground pigment subsequent to drying through the unit, disintegration is accomplished. The pigment agglomerates (press cake particles) are more weakly cemented together in this step of the process and action of a disintegrating nature is all that is required.

As many apparently widely different embodiments of this invention may be made without departing from the spirit and scope thereof, it is to be understood that I do not limit myself to the specific embodiment except as defined in the appended claims.

Having described the present invention, the following is claimed as new and useful:

1. A process for producing improved pigments exhibiting improved gloss properties and substantially complete freedom from coarse gritty particles which comprises subjecting a calcined pigment to series grinding, first in a high pressure fluid energy mill in the presence of steam at a temperature ranging from about 300–500° C. under a carrying pressure of from about 50–150 pounds per square inch, then to grinding treatment in a closed circuit wet-grinding system, drying the resulting pigment, and then subjecting the dried product to low pressure disintegrating grinding treatment in a fluid energy mill to remove aggregates formed during said drying treatment.

2. A process for producing an improved titanium pigment exhibiting improved gloss properties and substantially complete freedom from coarse gritty particles which comprises subjecting a calcined titanium pigment to series grinding treatment, first in a high pressure fluid energy mill in the presence of steam at a temperature of from about 300–500° C. under a carrying pressure of from about 50–150 pounds per square inch, then to grinding treatment in a closed circuit wet-grinding system, drying the product obtained from said wet grinding treatment, and then subjecting the dried material to low pressure disintegrating grinding treatment in a fluid energy mill to remove agglomerates formed during said drying treatment.

3. A process for producing improved pigments exhibiting improved gloss properties and substantially complete freedom from coarse gritty particles which comprises subjecting a calcined barium sulfate-extended titanium dioxide pigment to series grinding treatment, first in a high pressure fluid energy mill in the presence of steam at a temperature of from about 300 to about 500° C. and under a carrying pressure ranging from about 50–150 pounds per square inch, to effect pulverization of said pigment, then to treatment in a closed circuit wet grinding system, drying the pigment product recovered from said wet grinding system, and then subjecting the dried product to low pressure disintegrating grinding treatment in a fluid energy mill to remove agglomerates formed during said drying treatment.

4. A process for improving the gloss characteristics of a titanium oxide pigment and rendering the same substantially completely free from coarse, gritty particles, comprising subjecting said pigment after its discharge from a calciner to a plurality of pulverization treatments in series, initially in a high pressure fluid energy mill in the presence of steam at a temperature of from 300–500° C. under a carrying pressure of 50–150 pounds per square inch, thence to wet grinding in a closed circuit wet-grinding system equipped with a hydroseparator, drying the resulting pigment following said wet-grinding treatment, and then subjecting the dried product to low pressure milling disintegration in a fluid energy mill to remove agglomerates formed during said drying.

ROSCOE H. SAWYER.